June 22, 1943. D. C. BOWMAN 2,322,503
GREEN CORN FORK
Filed March 8, 1943

INVENTOR.
DANIEL C. BOWMAN.
BY Martin P. Smith, ATTY

Patented June 22, 1943

2,322,503

UNITED STATES PATENT OFFICE 2,322,503

GREEN CORN FORK

Daniel C. Bowman, Pendleton, Oreg.

Application March 8, 1943, Serial No. 478,359

1 Claim. (Cl. 30—148)

My invention relates generally to tableware and more particularly to a green corn fork and has for its principal object, to provide a simple, practical and inexpensive utensil having the general pattern of a table fork, and which is particularly designed to be used for the convenient cutting and removal of kernels from the cobs of boiled or roasted green corn and conveying said kernels to the mouth of the user.

In the general procedure incident to the eating of cooked green corn the kernels of corn are either bitten off by the eater, or cut from the cob with an ordinary table knife, both of which methods are more or less unsatisfactory, and it is one of the objects of my invention to provide a fork-like utensil having tines with sharp side edges, so that when the implement is moved lengthwise of an ear of cooked corn, it will cleanly cut therefrom, the kernels of two or more rows of corn, and which cut kernels lie on top of the tines of the implement so as to be conveniently conveyed to the user's mouth.

A further object of my invention is to construct the corn-cutting fork so that the forward ends of the two side tines are pointed and extend forward of the intermediate tines, in order that the implement may be conveniently guided during its travel lengthwise of the ear of corn, and also to materially increase the cutting action by the sharpened edges of the tines.

A further object of my invention is to provide the inner edges of the side tines and both side edges of the intermediate tines with sharpened corrugated or waved cutting edges so as to insure complete cutting of all kernels which pass between the tines.

With the foregoing and other objects in view, my invention consists in certain novel features of construction and arrangement of parts which will be hereinafter more fully described and claimed and illustrated in the accompanying drawing in which:

Figure 1:
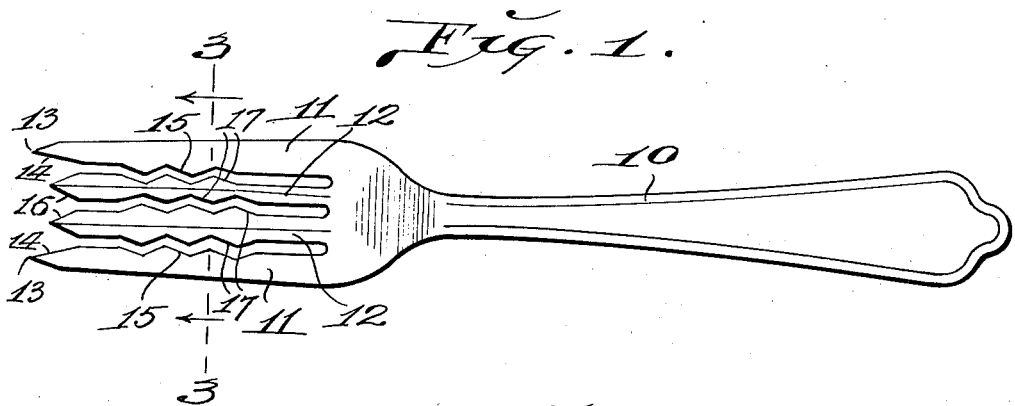
Fig. 1 is a plan view of the corn fork.
Figure 2:
Fig. 2 is a side elevational view of the fork.
Figure 3:
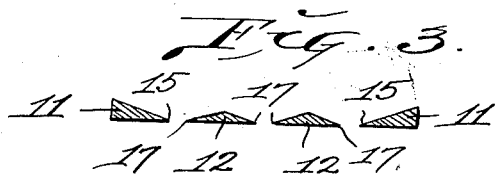
Fig. 3 is an enlarged cross section taken on the line 3—3 of Fig. 1.
Figure 4:
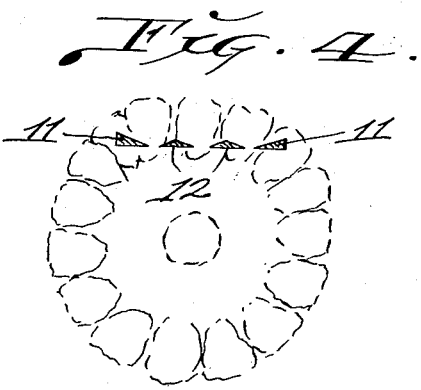
Fig. 4 is a cross section of an ear of corn and showing the position of the tines of the fork during the kernel cutting function.

Referring by numerals to the accompanying drawing, which illustrates a preferred embodiment of my invention, 10 designates a conventional fork handle which may be of any convenient size and shape and decorated as desired.

Formed integral with the forward end of handle 10 is a plurality of tines, preferably four as illustrated, the two side tines being designated by the numeral 11 and the two intermediate tines designated by numeral 12. All of the tines are curved lengthwise so that their intermediate portions are lower than their ends, similar to a conventional table fork.

The forward ends of the side tines 11, which extend a substantial distance forwardly of the intermediate tines 12, are pointed as designated by 13 and the inner edges of these pointed forward ends, which are inclined so as to converge toward the handled end of the fork, are sharpened as designated by 14.

The bodies of the tines 11 are substantially triangular in cross section throughout their lengths, with their upper and lower faces converging inwardly until they meet and form sharpened longitudinally waved or corrugated cutting edges 15.

The intermediate tines 12 are substantially triangular in cross section throughout their lengths and their forward ends which terminate adjacent the rear portions of the sharp edges 13 on tines 11 are pointed, thereby providing rearwardly diverging edges which are sharpened to form cutting edges 16.

The side edges of the tines 12 to the rear of the pointed forward ends, are sharpened and waved or corrugated longitudinally as designated by 17.

The spaces between the tines 11 and 12 are narrow and the corrugations on the edges 15 and 17 are arranged in relaton to each other, so that said spaces are waved longitudinally.

In using my improved fork, the sharp forward ends of the tines are inserted in the base portions of two or three rows of the kernels on the cob and the fork is now moved lengthwise of the cob, thereby cutting the kernels from the cob and by now handling the device as an ordinary fork, the cut kernels may be conveniently transferred to the mouth of the user.

Inasmuch as the side tines 11 project forwardly of the intermediate tines, the cutting of the kernels of corn in straight lines lengthwise of the cob is greatly facilitated and the relative arrangement of the sharp edges 14, 15, 16, and 17 insures complete cutting of all kernels that are engaged by the tines.

Thus it will be seen that I have provided a green corn fork that is simple in structure, inexpensive of manufacture and very effective in performing the functions for which it is intended.

It will be understood that minor changes in the size, form and construction of the various parts of my improved corn fork may be made and substituted for those herein shown and described without departing from the spirit of my invention, the scope of which is set forth in the appended claim.

I claim as my invention:

As a new article of manufacture, a green corn fork comprising a handle and a plurality of tines integral with the forward end of said handle, said tines having pointed forward ends and longitudinally disposed corrugated sharp edges.

DANIEL C. BOWMAN.